(12) United States Patent
Wilson et al.

(10) Patent No.: US 8,928,579 B2
(45) Date of Patent: Jan. 6, 2015

(54) INTERACTING WITH AN OMNI-DIRECTIONALLY PROJECTED DISPLAY

(76) Inventors: Andrew David Wilson, Seattle, WA (US); Hrvoje Benko, Seattle, WA (US)

( * ) Notice: Subject to any disclaimer, the term of this patent is extended or adjusted under 35 U.S.C. 154(b) by 1149 days.

(21) Appl. No.: 12/709,799

(22) Filed: Feb. 22, 2010

(65) Prior Publication Data

US 2011/0205147 A1    Aug. 25, 2011

(51) Int. Cl.
*G09G 5/00* (2006.01)
*G06F 3/01* (2006.01)
*G10L 15/26* (2006.01)

(52) U.S. Cl.
CPC ............. *G06F 3/011* (2013.01); *G10L 15/26* (2013.01); *G06F 3/017* (2013.01)
USPC ........... 345/156; 345/157; 345/633; 345/168; 345/173; 704/275; 715/860; 463/9; 463/4; 463/30; 463/31; 463/36

(58) Field of Classification Search
USPC ............... 345/156–157, 175, 633, 168, 173; 704/275; 715/866; 463/9, 4, 30, 31, 36
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

"Everywhere Interactive Displays", Jan. 20, 2009, downloaded from http://domino.watson.ibm.com/comm/research.nsf/pages/r.mobile.innovation.html, 3 pages.

(Continued)

*Primary Examiner* — Shaheda Abdin

(57) ABSTRACT

Concepts and technologies are described herein for interacting with an omni-directionally projected display. The omni-directionally projected display includes, in some embodiments, visual information projected on a display surface by way of an omni-directional projector. A user is able to interact with the projected visual information using gestures in free space, voice commands, and/or other tools, structures, and commands. The visual information can be projected omni-directionally, to provide a user with an immersive interactive experience with the projected display. The concepts and technologies disclosed herein can support more than one interacting user. Thus, the concepts and technologies disclosed herein may be employed to provide a number of users with immersive interactions with projected visual information.

16 Claims, 5 Drawing Sheets

(56) References Cited

U.S. PATENT DOCUMENTS

| | | |
|---|---|---|
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,744,569 B2 | 6/2004 | Geng |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,739,210 B2 | 6/2010 | Horvitz et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |

(56) References Cited

U.S. PATENT DOCUMENTS

| | | | |
|---|---|---|---|
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,069,166 B2 | 11/2011 | Alvarado et al. | |
| 8,072,470 B2 | 12/2011 | Marks | |
| 2008/0026838 A1 | 1/2008 | Dunstan et al. | |
| 2008/0242231 A1 | 10/2008 | Gray | |
| 2009/0077504 A1 | 3/2009 | Bell et al. | |
| 2009/0168027 A1 | 7/2009 | Dunn et al. | |
| 2009/0189857 A1 | 7/2009 | Benko et al. | |
| 2010/0066821 A1 | 3/2010 | Rosener et al. | |
| 2010/0067708 A1 | 3/2010 | Groth | |
| 2010/0328074 A1 | 12/2010 | Johnson et al. | |
| 2011/0183645 A1 | 7/2011 | Chawla | |
| 2013/0346084 A1 | 12/2013 | Archambault et al. | |

FOREIGN PATENT DOCUMENTS

| | | | |
|---|---|---|---|
| JP | 08-044490 A1 | 2/1996 | |
| WO | 93/10708 A1 | 6/1993 | |
| WO | 97/17598 A1 | 5/1997 | |
| WO | 99/44698 A1 | 9/1999 | |

OTHER PUBLICATIONS

"Interactions with an Omnidirectional Projector", Feb. 28, 2009, downloaded from http://chris.pirillo.com/interactions-with-an-omnidirectional-projector/, 1 page.

"Sphere: A Multi-Touch Interactive Spherical Display", Downloaded Jan. 21, 2010, from http://research.microsoft.com/en-us/um/people/benko/projects/sphere/, 4 pages.

Ahn et al., "Interactive Immersive Display", 2004, ICAT 2004, 4 pages.

Dehos, et al., "Radiometric Compensation for a Low-Cost Immersive Projective System", Oct. 27-29, 2008, VRST '08, Bordeaux, France, pp. 130-133.

Nagahara, et al. "Wide Field of View Head Mounted Display for Tele-Presence with an Omnidirectional Image Sensor", Jun. 16-22, 2003, Proceedings of the 2003 Conference on Computer Vision and Pattern Recognition Workshop (CVPRW '03), 6 pages.

Pyo, et al. "iProCam: A Lens-Sharing Projector-Camera System for Augmented Reality Applications", Apr. 28-May 3, 2007, CHI 2007, San Jose, California, pp. 2615-2620.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real-World Disorders", Mar. 27, 1995, The Washington Post, Science Psychology, 2 pages.

"Simulation and Training", 1994, Division Incorporated, 6 pages.

"Presence and Enhanced Presence" Office 2007 R2, Retrieved Jan. 25, 2012 from http://msdn.microsoft.com/en-us/library/dd941487(v=office.13).aspx, 3 pages.

INTERACTING WITH AN OMNI-DIRECTIONALLY PROJECTED DISPLAY

BACKGROUND

Touch screen technology has become more prevalent in recent years as the cost of touch screen technology has decreased. Thus, many modern devices include touch screen technology. For example, mobile telephones, copy machines, automatic teller machines, mobile computing devices, and computers may include touch sensitive technology for allowing users to interact with the devices without using traditional input/output ("I/O") devices such as keyboards and mice. The nature of touch sensitive displays has made such displays popular with users.

In many available devices, for example, users can interact with computers, move files, place phone calls, send emails, type, and perform other functions via touch screens. The ease with which users can interact with some touch sensitive devices, coupled with the seemingly ever-decreasing cost of including a touch sensitive display on a device, has resulted in increasing popularity of devices that include touch sensitive displays.

It is with respect to these and other considerations that the disclosure made herein is presented.

SUMMARY

Concepts and technologies are described herein for interacting with an omni-directional projected display. The omni-directional projected display is generated by an omni-directional projector and includes, in some embodiments, visual information projected on a display surface. The display surface can include almost any surface within projection range of the omni-directional projector.

A user is able to interact with the projected visual information using gestures in free space, voice commands, or other commands. The visual information can be projected omni-directionally, to provide a user with an immersive interactive experience with the projected display. Furthermore, the concepts and technologies disclosed herein can simultaneously support more than one interacting user at a particular time. Thus, the concepts and technologies disclosed herein may be employed to provide a number of users with immersive interactions with projected visual information.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
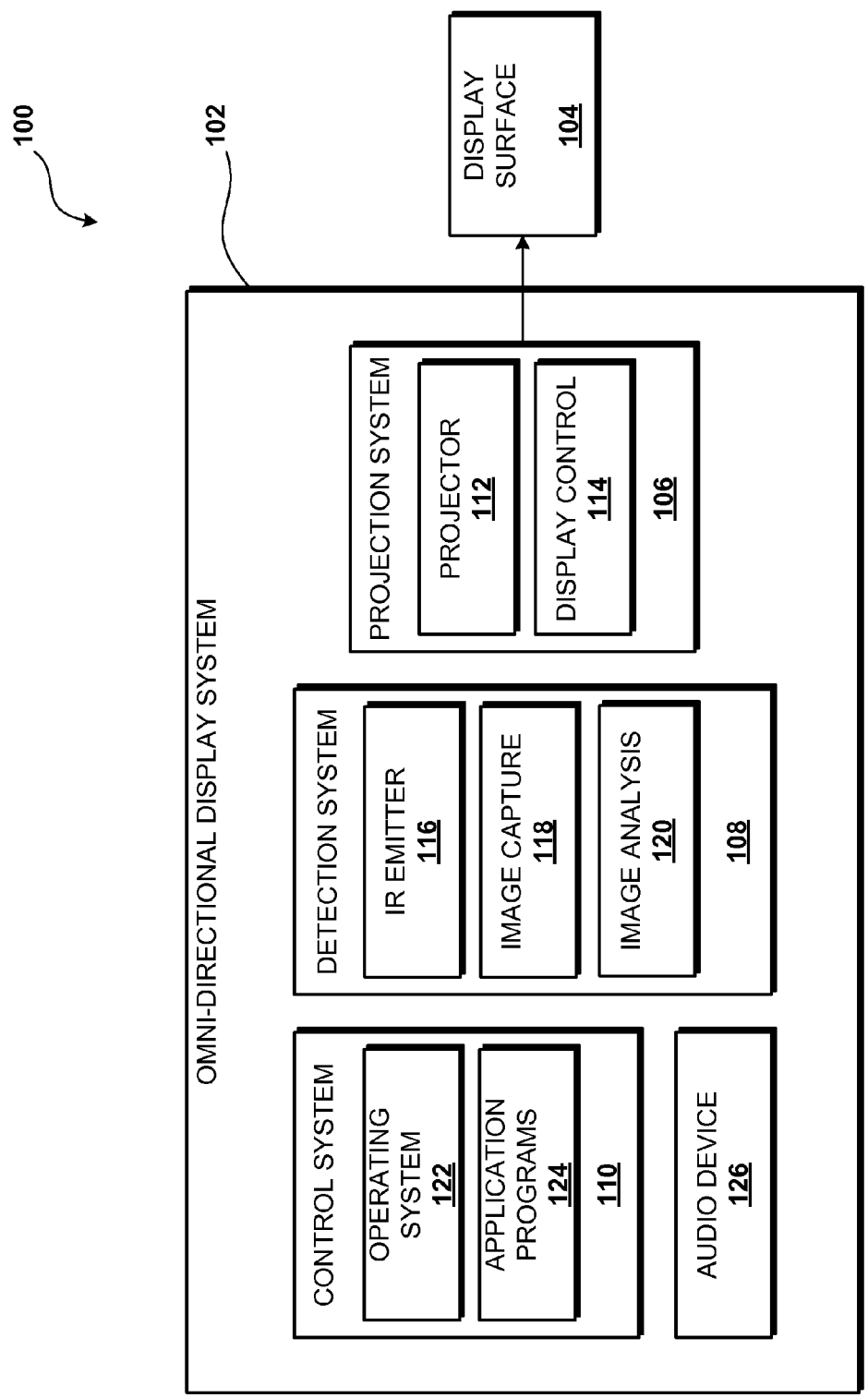
FIG. 1 is a system diagram illustrating an exemplary operating environment with which embodiments of the present disclosure may be employed.

The following detailed description is directed to mechanisms for interacting with an omni-directional projected display. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for interacting with an omni-directional projected display will be presented.

Referring now to FIG. 1, aspects of an operating environment 100 for the various embodiments presented herein will be described. The operating environment 100 shown in FIG. 1 includes an ODS 102 configured to project visual information on a display surface 104 and to detect control commands. The display surface 104 can include almost any surface within projection range of the ODS 102. For example, the display surface 104 can include the walls, ceiling, and floor of a room, a geodesic dome, one or more projection screens, furniture, tables, combinations thereof, and the like.

The ODS 102 includes a projection system 106 for projecting the visual information on the display surface 104, and a detection system 108 for detecting control commands. As will be described below in more detail, the use and/or movement of instruments, devices, light, human appendages, or other devices and/or structures, can define control commands for controlling the ODS 102. Thus, the detection system 108 is configured to detect and interpret movement or activation of various devices and/or structures, to analyze the detected movement and/or activation, and to determine if the detected movement and/or activation corresponds to one or more control commands.

A user of the ODS 102 interacts with an image displayed by the ODS 102 by way of control commands. While various methods and systems for issuing control commands for interacting with the ODS 102 are contemplated, the embodiments described herein are presented primarily with reference to human movements and/or voice commands that are used to control the ODS 102. The other methods and systems contemplated for controlling the ODS 102 presented herein are included in the scope of the appended claims.

As mentioned above, the ODS 102 is configured to project visual information onto the display surface 104 by way of the projection system 106. The projection system 106 can include a combination of hardware and software for controlling and projecting visual information associated with an application such as, for example, an application being provided by a computer system in communication with, or embedded in, the ODS 102. In some embodiments, the projection system 106 includes a projector 112, and a display control system 114. The projector 112 may be configured to project images, video, graphics, and/or other visual information (hereinafter collectively referred to as "visual information") onto the display surface 104, and the display control system 114 can be used to control output of the projector 112 based upon output received from the detection system 108, the control system 110, or the other components of the ODS 102. As will be more clearly understood below, the functions of the display control system 114 can be included in the detection system 108 and/or the control system 110, and may therefore be omitted from the projection system 106.

Although not illustrated in FIG. 1, the projection system 106 can include various additional projection components such as, for example, a wavelength filter for reflecting portions of the visible light emitted from the projector 112 toward the display surface 104. Additionally, the projection system 106 can include a lens for focusing the visual information projected by the projector 112.

As mentioned above, the ODS 102 is configured to project an image omni-directionally. Thus, it will be understood that various lenses, including fish-eye lenses, other wide angle lenses, and the like, may be employed in the projection system 106 of the ODS 102. Additional hardware such as adjustable mounts, power supplies, analog and/or digital I/O interfaces, mirrors, calibration systems, cooling systems, and the like, are not illustrated, but may be included in the projection system 106.

As described herein, human movements and voice commands can be used to control the ODS 102. In some embodiments, human movements include the use of defined hand and/or arm movements and configurations that correspond to specified control commands. The human movements may be made between the ODS 102 and the display surface 104, and are detected by the detection system 108 and/or components thereof. To facilitate detection of the human movements, the detection system 108 can include an infrared energy emitter 116 ("IR emitter") that acts as an IR illumination source for emitting IR energy. In some embodiments, the IR emitter 116 includes an IR illumination ring that surrounds a lens of the projection system 106.

The detection system 108 also includes an image capture device 118. The image capture device 118 can include, for example, an IR camera for detecting and capturing images of reflected IR energy. It will be understood that the IR energy emitted by the IR emitter 116 can be reflected at a substantially continuous level if no structure is placed between the IR emitter 116 and the display surface 104. If a structure, e.g., a hand, is placed between the IR emitter 116 and the display surface 104, the structure can reflect the emitted IR energy at a different level than that of the display surface 104. The image capture device 118 can capture images corresponding to the reflected IR energy and analyze the captured images for changes, thus detecting a configuration of, and/or a movement of, a structure between the ODS 102 and the display surface 104.

The image capture device 118 is disposed such that the image capture device 118 shares a substantially identical line-of-sight with an output, e.g., a lens, of the projection system 106. By collocating the image capture device 118 and the lens of the projection system 106, the ODS 102 can determine where a movement, e.g., a hand gesture, occurs with respect to a projected image without determining a range between the IR emitter 116 and the moving object, e.g., a hand.

To facilitate analysis of images captured by the image capture device 118, the detection system 108 includes an image analysis system 120 that compares captured images to recognize movements and/or gestures. The image analysis system 120 can be used by the detection system 108 to recognize control commands, and to define movements in terms of location within the field of view. The control commands detected and/or recognized by the image analysis system 120 can be output by the detection system 108 to an application for a determination as to how the captured movement affects the application. Although not illustrated in FIG. 1, it should be understood that the detection system 108 can include additional hardware and/or software such as, for example, power supplies, IR pass filters, mirrors, analog and/or digital I/O interfaces, combinations thereof, and the like.

Figure 5:
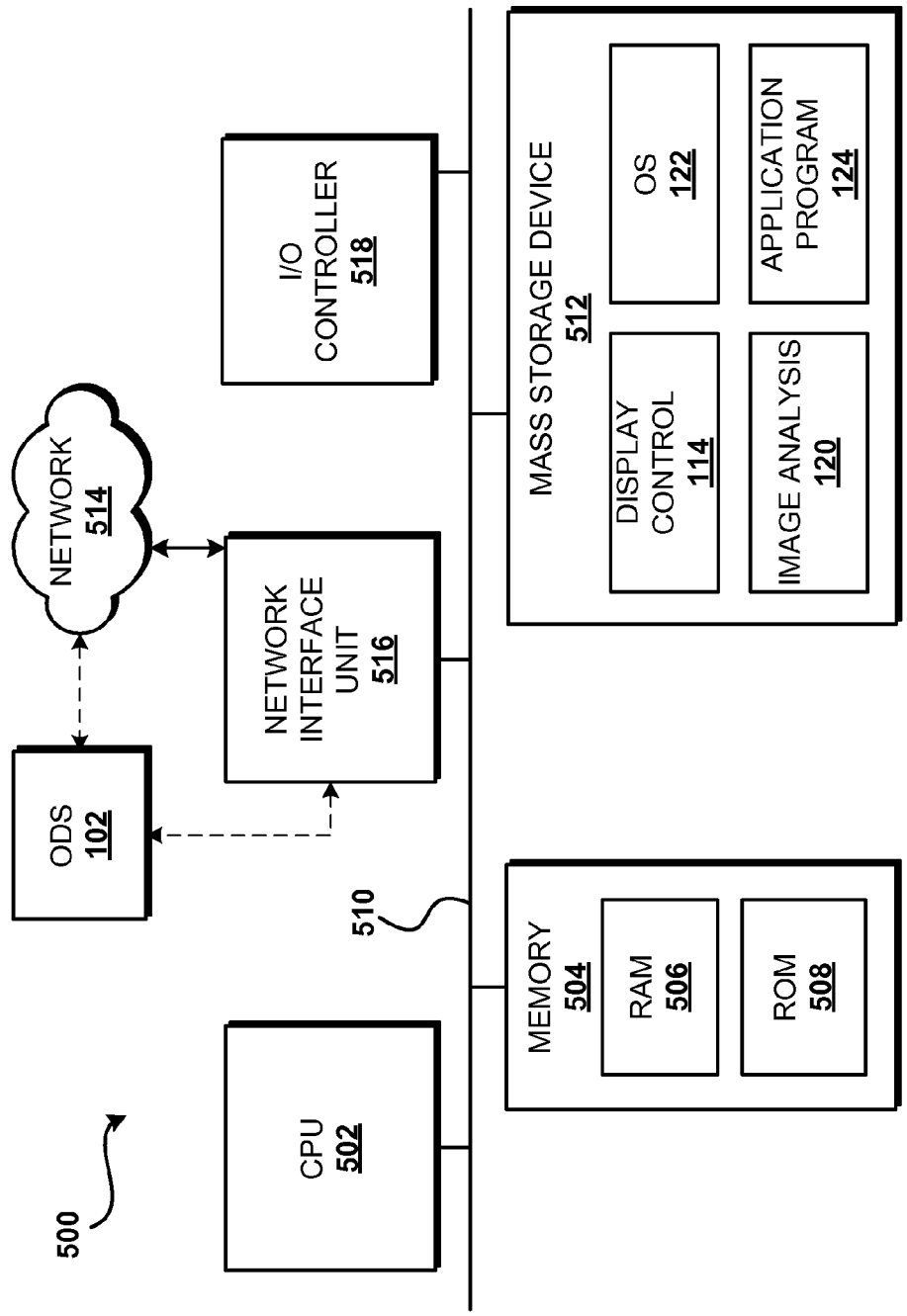
FIG. 5 is a computer architecture diagram that illustrates an exemplary hardware and software architecture for a control system of the ODS, according to an exemplary embodiment of the present disclosure.

The ODS 102 also includes a control system 110. In some embodiments, the control system 110 is a component of the ODS 102, and in some embodiments, the control system 110 is a stand-alone control system such as, for example, a computer that is communicatively linked to the ODS 102. Thus, it should be understood that the control system 110 can be embedded in the ODS 102, can be communicatively linked to the ODS 102 via a direct link, or can communicate with the ODS 102 via one or more networks (not illustrated). Although not illustrated in FIG. 1, it should be understood that the control system 110 may operate in conjunction with other computing systems on or in communication with various networks to provide the functionality described herein. According to various embodiments, the control system 110 includes a standard desktop or laptop personal computer system, a server computer, a handheld computer, an embedded computer system, a personal digital assistant, a mobile telephone, or another type of computing device known to those skilled in the art. An exemplary architecture of a device suitable to serve as the control system 110 will be described in additional detail below with reference to FIG. 5.

The control system 110 executes an operating system 122 and one or more application programs 124. The operating system 122 is a computer program for controlling the operation of the control system 110 and/or the ODS 102. The application programs 124 are executable programs configured to execute on top of the operating system 122. In the illustrated embodiments, the application programs 124 can include a movement detection program, a movement analysis program, a display manipulation program, and other programs including, but not limited to, word processing programs, spreadsheet programs, electronic mail programs, database programs, media playback programs, video and/or audio conferencing programs, web browsers, or other types of programs.

As explained above, the projection system 106 and/or the detection system 108 can include one or more movement detection programs, movement analysis programs, display manipulation programs, and other programs relating to the controlling and displaying of images. Thus, detection, analysis, and interpretation of interactions with the ODS 102, can be performed by components of the projection system 106 and/or the detection system 108 instead of, or in addition to, the application programs 124.

According to one implementation, the application programs 124 output data corresponding to visual information for projection by the projection system 106. The projection system 106 projects the visual information on the display surface 104. The detection system 108, meanwhile, emits IR energy and captures and interprets movements and/or other interactions with the ODS 102 to determine if a control command has been received at the ODS 102. If the detection system 108 determines that movements and/or other interactions with the ODS 102 correspond to a recognized control command, the detection system 108 formats data relating to the recognized control command into a recognizable instruction and passes the instruction to the appropriate application program 124 for execution. The application program 124 implements the instruction, and the output of the application program 124 is manipulated correspondingly. The output from the application program 124 is output for projection by the projection system 106, and the cycle repeats. Thus, a captured and implemented control command results in the manipulation of the image projected by the projection system 106 of the ODS 102. It will be understood, therefore, that the ODS 102 processes received control commands and outputs display signals that reflect implementation of the received control commands by the application programs 124.

In some embodiments, the ODS 102 uses voice commands as well as, or instead of, the human movements described above. For example, voice commands may be used to activate the detection system 108 and/or the projection system 106 of the ODS 102, to validate or confirm control commands determined by the ODS 102 prior to execution of the control commands, or for other purposes. Therefore, the ODS 102 can include an audio device 126 such as, for example, a microphone or an audio input ("microphone"). The microphone 126 may be worn by a user of the ODS 102, or may be located at the ODS 102 for capturing an audio signal at the ODS 102. The microphone 126 can be used to collect voice commands, as will be explained below.

In some embodiments, movements by humans or instruments are ignored by the ODS 102 unless supplemented or confirmed by one or more voice commands. Thus, the ODS 102 is configured to ignore random movements made near the ODS 102 to avoid erroneous execution of unintended control commands. Such functionality can be particularly useful when the ODS 102 is used simultaneously by a number of users. In such embodiments, some users may inadvertently make motions interpreted by the ODS 102 as control commands. The ODS 102, however, is configured to ignore those control commands unless the corresponding voice command is received. These and other features of the ODS 102 will be described below in more detail.

It should be appreciated that the operating environment 100 illustrated and described in FIG. 1 are illustrative of one suitable operating environment. Thus, the particular hardware, software, and functionality described herein should not be construed as limiting the scope of the claims in any way. Other operating environments for providing the functionality disclosed herein may be utilized without departing from the scope of this disclosure. Additional details of several hardware components discussed above with reference to the projection system 106 and the detection system 108 can be found in co-pending U.S. patent application Ser. No. 12/122,736, published on Jul. 30, 2009 as U.S. Pat. App. Pub. No. 2009/0189857, the disclosure of which is hereby incorporated by reference in its entirety. Additional details regarding the operation of the ODS 102 and the various components thereof will be provided below with reference to FIGS. 2-5.

Figure 2:
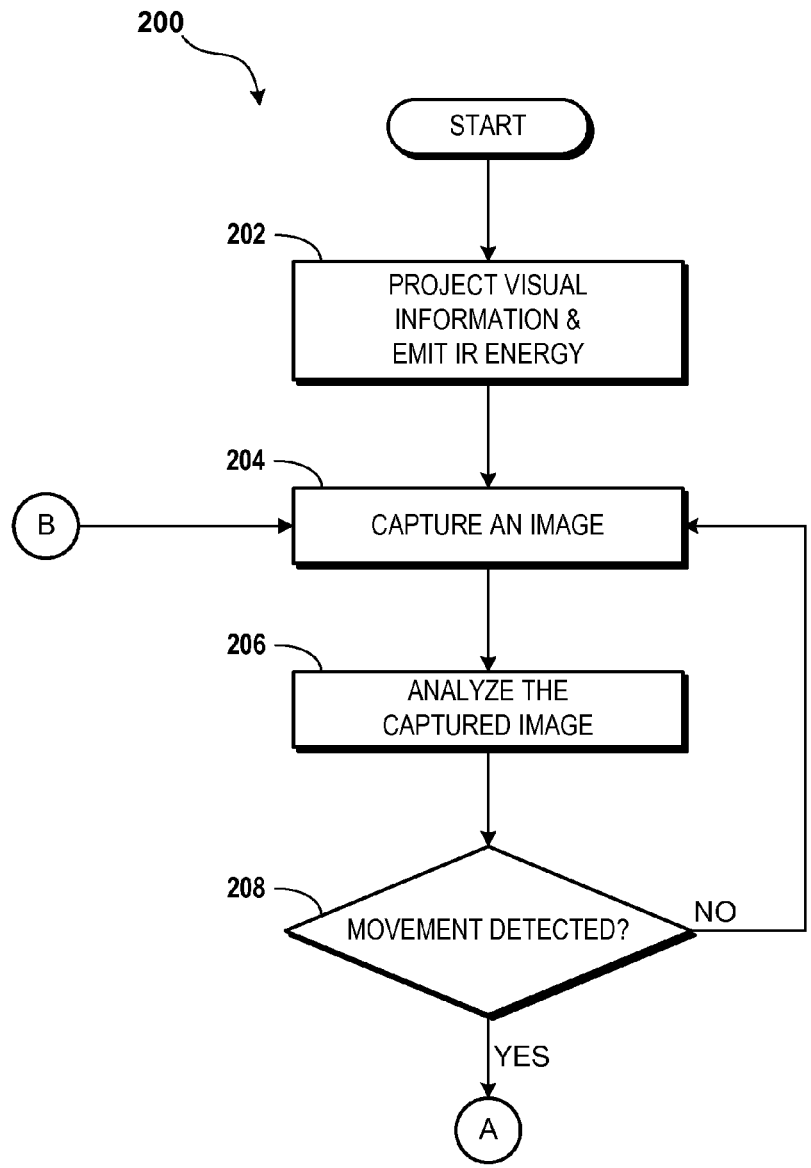
FIG. 2 is a flow diagram that schematically illustrates a method for interacting with an omni-directional display system ("ODS"), according to an exemplary embodiment of the present disclosure.

Turning now to FIG. 2, an exemplary method 200 for interacting with an omni-directional display system ("ODS") will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the method disclosed herein can be ended at any time and need not be performed in their respective entireties. Some or all operations of the methods, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that some, but not necessarily all, of the logical operations described herein with respect to the disclosed methods may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the some of the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the ODS 102, though it will be understood that the ODS 102 can provide the functionality described herein in conjunction with the projection system 106, the detection system 108, and/or the control system 110, any and/or all of which may execute the application programs 124 and/or other programs (not illustrated). Thus, the described embodiments are exemplary and should not be viewed as being limiting in any way.

The method 200 begins at operation 202, wherein the ODS 102 projects visual information on a display surface 104 and emits infrared (IR) energy. As explained above, the visual information displayed by the ODS 102 can be generated by an application, e.g., the application programs 124, and can be output by the application for display. As will be discussed in more detail with respect to the described examples, the visual information displayed on the display surface 104 can correspond to panoramic photographs, astronomical images and/or data, social networking information, video conferencing images and/or data, gaming images and/or data, structural/architectural images and/or data, navigational information and images, combinations thereof, and the like.

The display surface 104 can include virtually any material that reflects light emitted by the projection system 106. Thus, the ODS 102 can be placed in a room, and the display surface 104 can include the walls, ceiling, and/or floor of the room, as well as projection screens, furniture, and/or other objects, structures, and/or even people located in the room. In one implementation, a geodesic dome is used as the display surface 104. It will thus be understood that the ODS 102 can be used at virtually any location, with performance of the ODS 102 being dependent upon the quantity and/or intensity of ambient light sources at the location, the intensity of the projection system 106, the reflectivity of the display surface 104 at the location, combinations thereof, and the like.

It should be understood that the functionality described at operation 202 can be considered a general operating state of the ODS 102, wherein the ODS 102 functions primarily as a projector, i.e., projects images onto a display surface 104. While the ODS 102 may emit IR energy, the ODS 102 has not detected any interactions with the ODS 102. In some embodiments, a voice command or other command prompts the ODS 102 to begin emitting IR energy and/or to begin capturing images to detect movement between the ODS 102 and the display surface 104, though this is not necessarily the case. Thus, though not illustrated in FIG. 2, the ODS 102 can activate the detection system 108 in response to receiving a command. Alternatively, the detection system 108 can be activated when the ODS 102 is powered on.

From operation 202, the method 200 proceeds to operation 204, wherein the ODS 102 captures an image using, for example, the image capture device 118. It will be appreciated, in light of the description of operation 202 above, that the functionality of operations 202 and 204 can be combined and can be viewed as the standard operating state of the ODS 102. Thus, operation 204 can include projecting visual information at the ODS 102 and emitting IR energy at the ODS 102.

As explained above, the image capture device 118 is configured to generate an image corresponding to reflected IR energy as collected at a point collocated with a lens of the ODS 102. Thus, the image captured at operation 204 can indicate a quantity and intensity of IR energy reflected from the environment around the ODS 102, e.g., the display surface 104, as "seen" at the output lens of the ODS 102. This amount of energy can be normalized and effectively ignored by the detection system 108, as is generally understood. Thus, what may be considered an ambient level of IR energy can be included in the captured image. If another structure, e.g., a hand, is placed between an IR emitting source of the ODS 102 and the display surface 104, however, the detection system 108 can detect a "spike" in the amount of reflected IR energy in the captured image. Furthermore, the contours of the structure, e.g., the hand, can be extracted from the image captured at operation 204.

From operation 204, the method proceeds to operation 206, wherein the ODS 102 analyzes the captured image to detect changes, e.g., movement of an instrument, a projected energy beam, a human appendage, or another tool or structure used to control the ODS 102. In some embodiments, the ODS 102 compares the image captured at operation 204 to an image captured immediately prior to the image captured at operation 204, and compares the two images. Depending upon a frame rate of the image capture device 118, the ODS 102 can detect movement between the ODS 102 and the display surface 104 in a relatively short amount of time. For example, if the ODS 102 captures images as a frame rate of thirty frames per second, the ODS 102 can detect the introduction of a structure between the ODS 102 and the display surface, and can detect movement of that structure, in 0.033 seconds and 0.066 seconds, respectively. For high precision applications, the ODS 102 can employ image capture devices 118 with high and/or extremely high frame rates, for example, high speed cameras, which will not be described herein in detail. Similarly, lower frame rates are possible and are contemplated.

From operation 206, the method 200 proceeds to operation 208, wherein the ODS 102 determines if a movement has been detected at the ODS 102. The ODS 102 can make the determination of the operation 208 based upon a simple comparison of two images, as described above, or can be based upon a comparison of multiple captured images to detect and track movement of a structure over time. If a movement has not been detected, the method 200 returns to operation 204, wherein the ODS 102 continues projecting visual information, emitting IR energy, and/or capturing images. If, at operation 208, the ODS 102 determines that a movement has been detected, the method 200 ends, and the ODS 102 can execute instructions providing the operations illustrated and described in FIG. 3, if desired.

Figure 3:
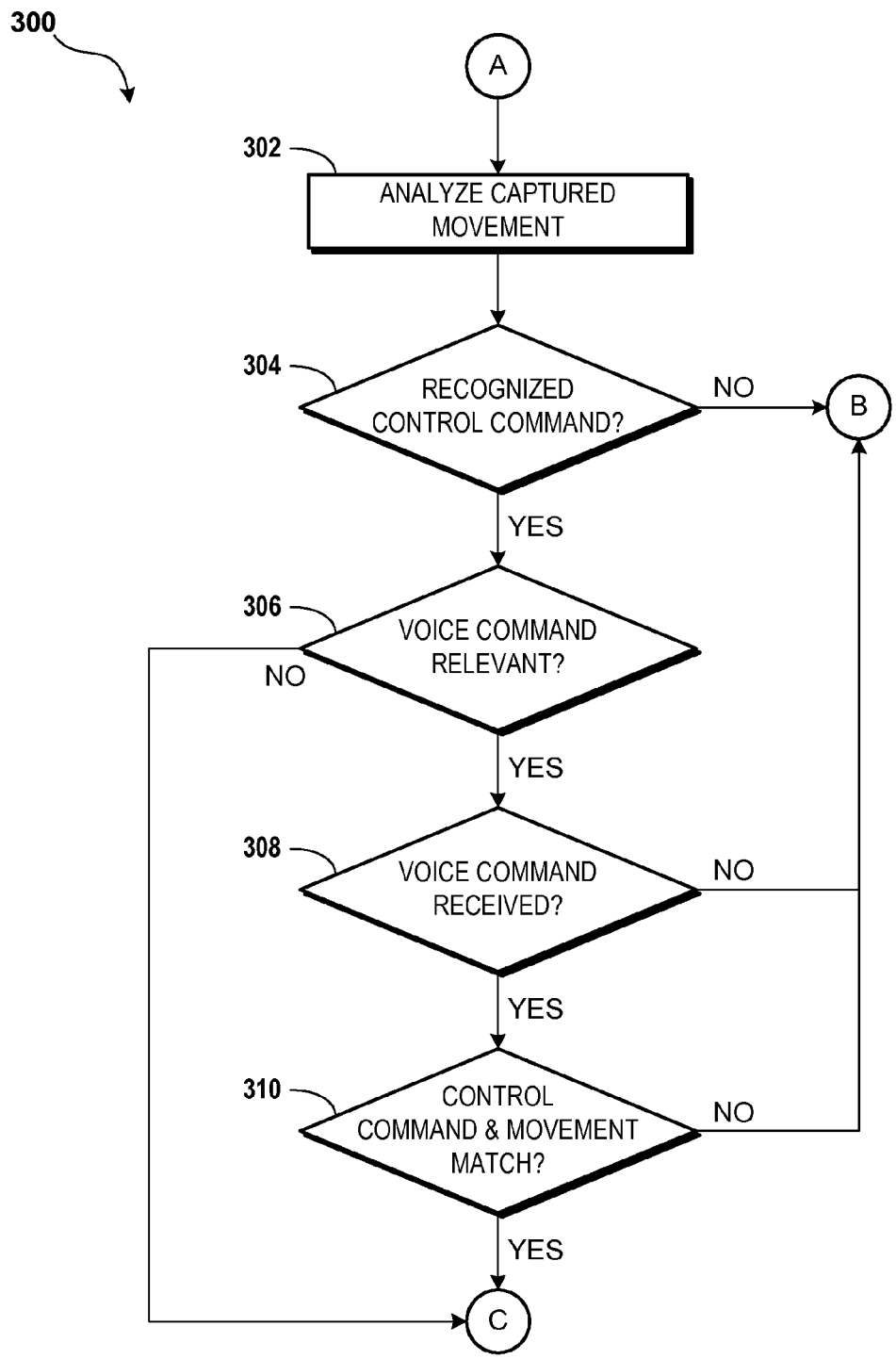
FIG. 3 is a flow diagram that schematically illustrates a method for determining if a control command has been received at the ODS, according to an exemplary embodiment of the present disclosure.

FIG. 3 schematically illustrates a method 300 for determining if a control command has been received at the ODS 102, according to an exemplary embodiment of the present disclosure. The method 300 begins at operation 302, wherein the ODS 102 analyzes movement captured in the method 200 to determine if the captured movement corresponds to a recognized control command. For example, the ODS 102 can analyze the movement of a structure into the field of vision of the detection system 108, and the shape of the structure that moved into the field of vision of the detection system 108. In some embodiments, the ODS 102 is configured to recognize certain shapes, and to associate those shapes with various control commands. Thus, a shape, for example a hand gesture, can be recognized from the movement captured in the method 200. It should be understood that the ODS 102 can make use of various algorithms and/or other programs to analyze structure shapes and movements captured in the method 200 to determine if a control command has been detected at the ODS 102, though these particular algorithms and/or programs are not described herein in detail.

Some control commands associated with the ODS 102 require not only a particular shape, or gesture, but also movement of that shape or gesture. Thus, operation 302 includes, in some embodiments, analyzing the captured images to determine not only if a particular shape is present, but also if that shape has been moved with respect to the ODS 102 and/or the projected visual information. These functions of the ODS 102 will be discussed in greater detail below with reference to FIG. 4.

From operation 302, the method 300 proceeds to operation 304, wherein the control system 110 determines if the captured movement analyzed at operation 302 is a control command that is recognized by the ODS 102. If the movement analyzed at operation 302 is not recognized by the ODS 102 as a control command, the method 300 ends, and flow returns to operation 204 of the method 200 illustrated in FIG. 2. If the movement analyzed at operation 302 is recognized by the ODS 102 as a control command, the method 300 proceeds to operation 306.

At operation 306, the ODS 102 determines if a voice command is relevant to the recognized control command. For example, the ODS 102 can be configured to require a voice command before executing certain control commands to reduce the incidence of false control command recognition. Thus, by requiring a voice command in conjunction with certain control commands, the ODS 102 can be used in environments with multiple users who purposefully and/or inadvertently make movements that may be interpreted by the ODS 102 as control commands. Voice command/control command associations can be defined and stored within applications, and/or in data storage devices such as memory devices, databases, and the like. Thus, operation 306 can include accessing a data storage location or executing computer-executable instructions to determine if a voice command corresponds and/or is relevant to the recognized control command.

Figure 4:
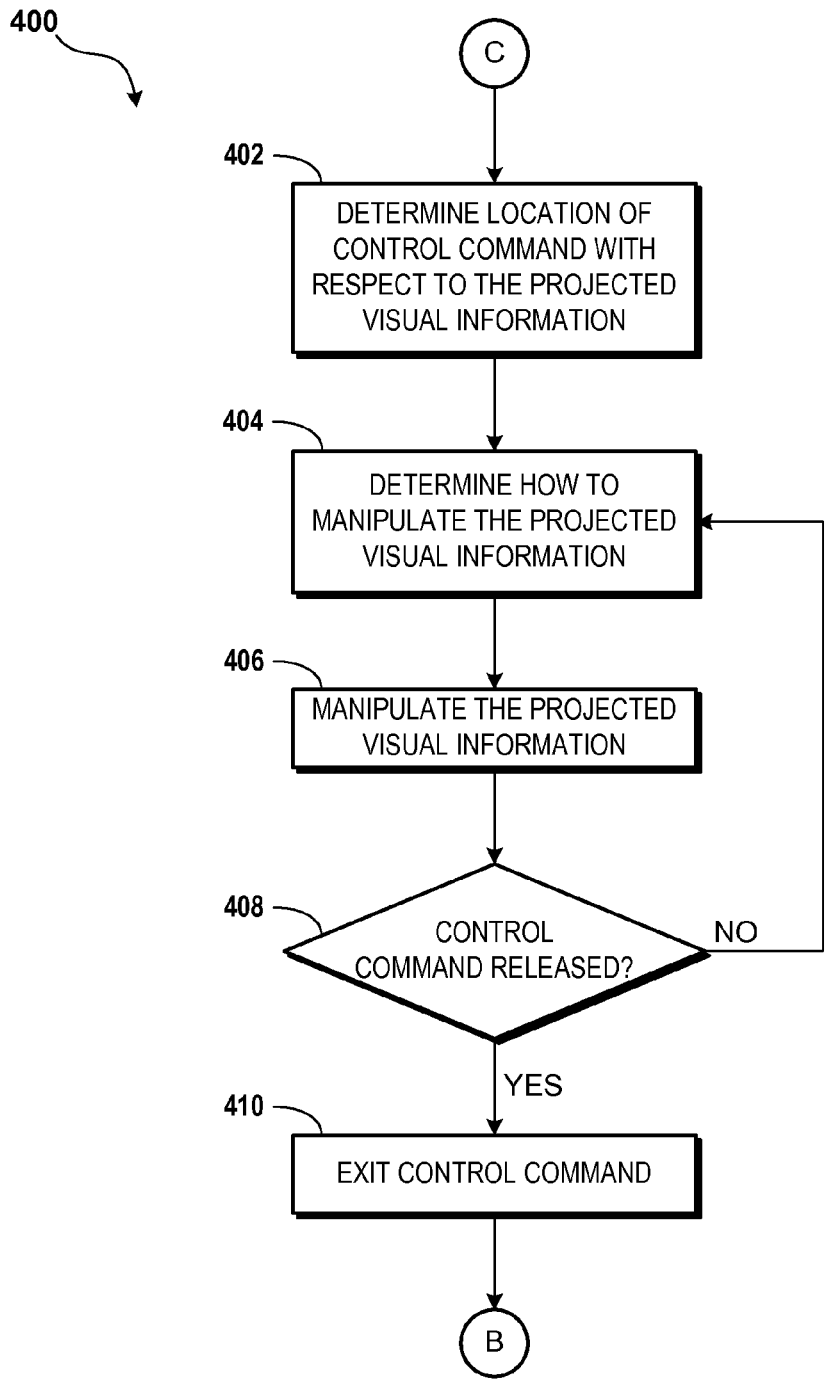
FIG. 4 is a flow diagram that schematically illustrates a method for executing a control command received at the ODS, according to an exemplary embodiment of the present disclosure.

If the ODS 102 determines that a voice command is not relevant to the received control command, the method 300 ends, and the ODS 102 can execute instructions providing the operations illustrated and described in FIG. 4, if desired. If the ODS 102 determines that a voice command is relevant to the recognized control command, the method 300 proceeds to operation 308, wherein the ODS 102 determines if a voice command has been received at the ODS 102. The voice command can be received at the ODS 102 via, for example, the microphone 126, which can be worn by a user of the ODS 102 and/or can be built into the ODS 102 for recording an ambient audio signal measured at or proximate to the ODS 102.

If the ODS 102 has not received a voice command, and the voice command is relevant to the recognized control command, the method 300 ends, and the flow can return to operation 204 of the method 200 illustrated in FIG. 2. If the ODS 102 has received a voice command, the method 300 proceeds to operation 310. It should be appreciated that the user can receive feedback from the ODS 102 if a control command is recognized, but not accompanied by the appropriate voice command.

At operation 310, the ODS 102 determines if the recognized control command and the received voice command are consistent with one another. In other words, the ODS 102 can determine if the received voice command is appropriate for use with the recognized control command If the received voice command and the recognized control command are consistent with one another, the method 300 ends, and the ODS 102 can execute instructions providing the operations illustrated and described in FIG. 4, if desired. If the received voice command and the recognized control command are not consistent with one another, the method 300 ends, and flow returns to operation 204 of the method 200 illustrated in FIG. 2.

FIG. 4 schematically illustrates a method 400 for executing a control command received at the ODS 102, according to an exemplary embodiment of the present disclosure. The method 400 begins at operation 402, wherein the ODS 102 analyzes the captured images and the projected visual information to determine a location of the detected control command with respect to the projected visual information. As explained above with reference to FIG. 1, because the lens of the projection system 106 and the image capture device 118 of the detection system 108, are collocated, the movement of the structure used to generate the control command, as observed at the image capture device 118 correlates to the movement of the structure with respect to the projected visual information. Furthermore, because certain control commands include not only generating certain shapes or gesture, but also movement of those shapes or gestures with respect to the projected visual information, operation 404 further can include a determination as to whether the shape or gesture has been moved with respect to the projected visual information, and how the shape or gesture has been moved.

As mentioned above, the distance between the detection system 108, and the tool, structure, appendage, or other device used to generate the control command is not needed to provide the functionality described herein, since the ODS 102 recognizes movement of the structure with respect to the displayed visual image, not with respect to any other reference. Furthermore, because the projected visual information is blocked by the structure introduced between the ODS 102 and the display surface 104, the user introducing the structure is provided with visual feedback in form of a shadow on the display surface 104, wherein the location and contours of the shadow generated by the structure introduced by the user will correspond substantially directly to the image captured by the image capture device 118. Because the feedback is visible to the user directly in the displayed visual image, and because the displayed visual image and the captured image directly correspond to one another, the user typically does not have to take into consideration parallax, distortions in the display surface 104, or other variants.

From operation 402, the method 400 proceeds to operation 404, wherein the ODS 102 determines how to manipulate the projected visual information in response to the received control command. Data indicating the recognized control command and the movement of the structure forming the control command with respect to the projected visual information can be passed to an application, for example, the application programs 124. The application programs 124 implement the received data and execute instructions corresponding to the control command and movement of the control command, and generate, as output, visual information for projection by the ODS 102. Operation 404 can include, for example, determining what the output of the application programs 124 should look like in light of a control command for zooming in, zooming out, rotating, panning, and other commands.

From operation 404, the method 400 proceeds to operation 406, wherein the application programs 124 output visual information for display by the ODS 102, wherein the visual information incorporates the manipulation determined by the ODS 102. Thus, the ODS 102 manipulates the projected visual information in accordance with the control command received at the ODS 102.

As explained above, some control commands are based not only upon a certain shape, but also upon movement of certain shapes or gestures with respect to the projected visual information. As such, the method 400 proceeds to operation 408, wherein the ODS 102 determines if the control command has been released, i.e., if the shape or gesture has been released and/or if movement of the shape or gesture has ceased. More particularly, in one embodiment, for example, a control command to zoom out of an image is entered by forming a "pinch" with each hand, and moving the pinched hands toward one another. Similarly, a pan command can be entered by pinching with one hand, and moving the pinched hand in the direction in which the panning is desired. The pinch gesture described herein can be obtained, for example, by forming a circle with the fingers, e.g., by touching one's forefinger and thumb of a hand together. The pinch gesture is relatively easy to form intentionally, and relatively easy to avoid forming unintentionally.

Additional embodiments of the control commands include the cotemporaneous use of pinched hands of a user. For example, a user forms a pinch gesture with each of his two hands, and pulls them apart or pushes them together to zoom in or out, respectively. As the one or more control commands are formed, the ODS 102 recognizes the control commands and determines where the control commands are made with respect to the projected visual information. The ODS 102 thereby recognizes and assigns gesture points, i.e., points on the projected visual information corresponding to the location, with respect to the projected visual information, at which the gestures used to form the control commands are made. In some implementations, the ODS 102 manipulates the projected information by moving the gesture points with the moving gestures. Thus, if the gestures are moved apart, the ODS 102 moves the gesture points apart, effectively zooming into or enlarging the projected visual information. Similarly, if the gestures are moved together, the ODS 102 moves the gesture points together, effectively zooming out of the projected visual information.

In some implementations, the ODS 102 is configured to respond to the control commands by manipulating a graphics camera, i.e., a point of view from which the projected visual information is rendered. For example, the ODS 102 may be configured to manipulate the position, pitch, roll, and/or target of the graphics camera. In some implementations, as gesture points are moved apart, the ODS 102 moves the graphics camera toward the target of the graphics camera. As the gesture points are moved together, the ODS 102 moves the graphics camera away from the target. If one gesture is formed, the ODS 102 can be configured to move the target of the graphics camera with the moving gesture point. If two gestures are formed and moved with respect to one another, the ODS 102 may be configured to roll the graphics camera an amount corresponding to the movement of one gesture point with respect to the second gesture point. Thus, if a first gesture point is stationary and a second gesture point is translated, the ODS 102 can treat the first gesture point as an axis of rotation, and can rotate the projected visual information, or the graphics camera, an amount consistent with the translation of the second gesture point. If multiple gesture points are translated simultaneously, the ODS 102 can create an axis of rotation almost anywhere in the projected visual information. It should be understood that the axis of rotation need not be placed between the gesture points.

In addition to the control commands described above, the ODS 102 can be further configured to apply rate control commands based upon movement of the gestures and/or gesture points. In one implementation, a rate control feature for a zoom command is accessed by measuring a distance between the gesture points at the start of the gesture, i.e., the distance between the gesture points when the control command is recognized, and comparing that distance to a distance measured between the gesture points at a second time, for example a current time. The zoom rate can be proportionally changed based upon the difference between the measured distances. Thus, as the pinched hands are moved apart from one another to indicate a control command for zooming out, the zoom rate can proportionally increase based upon continued movement of the pinched hands and/or the gap formed between the gesture points. Similarly, if the movement of the gesture points is understood by the ODS 102 as a command to move the graphics camera, the ODS 102 can proportionally change the rate at which the camera is moved based upon the difference between the measured distances. It should be understood that if a rate control feature is accessed, the ODS 102 may move the gesture points an amount that is disproportionate and/or different than a corresponding distance that the gestures are moved with respect to the projected visual information.

In another embodiment, certain other gestures such as forming a large circle or triangle using both hands, or simultaneous display of two pinched hands held together, prompt the ODS 102 to execute specified control commands. In one implementation, forming a large circle or triangle using both hands is used to activate the voice command recognition capabilities of the ODS 102. Thus, the ODS 102 can be configured to ignore voice commands until the command to activate voice recognition control command is recognized by the ODS 102.

If the ODS 102 determines that the control command has not been released, the method 400 returns to operation 404, wherein the ODS 102 determines how to manipulate the projected image as discussed above. Thus, the ODS 102 can determine whether to accelerate a zooming operation, to continue panning, and/or the like, for example, or whether to implement other commands and/or controls. If the ODS 102 determines that the control command has been released, the method 400 proceeds to operation 410, wherein the ODS 102 exits the control command. The method 400 ends, and flow can return to operation 204 of the method 200 illustrated in FIG. 2, if desired.

According to various embodiments, the ODS 102 may be used to provide one or more users with a video conferencing service. In accordance with exemplary embodiments of the disclosure, one or more imaging devices and/or audio devices are located at a first location, for example, a conference room at a first office or facility. The imaging devices are in communication with the ODS 102, which is located at a second location remote from the first location. The imaging and/or audio devices can communicate with the ODS 102, for example, via a direct link or via the Internet, an intranet, and/or other network connections. The images from the imaging devices can be displayed on the display surface 104, and the audio from the audio devices can be played for the user. Thus, a user at the ODS 102 can be "immersed" into the conference occurring at the remote location. Because the ODS 102 is able to project an omni-directional image, a user of the ODS 102 can turn his or her body to face different conference participants, or can use control commands to pan or zoom the display, if desired.

The ODS 102 also may be used to navigate and/or control the viewing of panoramic images and/or virtual tours of various places and/or facilities. A panoramic image is displayed on the display surface 104, and the user of the ODS 102 is immersed into the panoramic view. The user of the ODS 102 can turn his or her body to face different portions of the panoramic view, or can use control commands to pan or zoom the display, if desired.

Similarly, the ODS 102 may be used to provide virtual walkthroughs or tours. For example, a user can turn his or her body to face different portions of the display surface 104, or pan the display if desired, and enter a control command to "walk" in a particular direction. In response to the control command to "walk," the ODS 102 can display animations or real time video signals corresponding to the entered commands. It is contemplated that a user of the ODS 102 can control a remote mobile camera using such commands, thereby navigating a remote device through a facility or other location using zoom, pan, and/or other control commands. Similarly, the ODS 102 may be used to tour various places of interest including, but not limited to, museums, hiking trails, national parks, museum exhibits, historical places, archeological excavation sites, underwater exploration routes, space exploration routes, and/or other places of interest. Images for such tours can be generated using video cameras, still cameras, or the like, and can make use of other technologies such as, for example, MICROSOFT PHOTOSYNTH, and the like.

The ODS 102 also may be used to provide immersive gaming capabilities. For example, the ODS 102 can provide a user with a first person gaming interface or other gaming experience, wherein the projected visual information is manipulated by the user via gestures and/or voice commands. In one example, a user plays tennis or pong with the ODS 102, and uses his or her hand as a tool to "hit" a ball. In another example, the user plays a first person game in the ODS 102, using gestures to walk through the various levels of the game, and to interact with aspects of each level.

The ODS 102 also may be used to explore various forms of data in graphical form. For example, the ODS 102 may be used to navigate the universe using other technologies such as, for example, MICROSOFT WORLDWIDE TELESCOPE, and the like. Additionally, a user of the ODS 102 can explore data in graphical form. Examples of data include, but are not limited to, exploration of social networking maps, chemical compounds, DNA structures, and the like.

The ODS 102 also may be used to provide virtual reading services and/or virtual meeting services. In one contemplated embodiment, the ODS 102 is used to provide a virtual library, wherein a user navigates through the library using pan and/or zoom control commands, or accesses a catalogue using a voice or command interface. The ODS 102 may be positioned to project the projected visual information at a location near a seated user, for example, onto a desk, table, or other surface. The user can "turn pages" of the selected "material" using gestures, voice commands, and/or other commands, without relying upon specific devices, interfaces, or proximity to the ODS 102.

In a related example, the ODS 102 is used to provide paperless board meetings, wherein the ODS 102 projects "copies" of documents onto a conference table or other display surface 104. Meeting participants are able to independently navigate the "documents" projected in their vicinity using gestures and/or other commands. Because the ODS 102 can recognize multiple gestures at any given time, each of the meeting participants can navigate the "documents" independently, without affecting his or her neighbor's "documents."

Although not described above in detail, it is possible to interact with the projected visual information by way of other devices and technologies. In one embodiment, for example, a user interacts with the ODS 102 using an IR laser pointer or other energy beam. The detection system 108 can be configured to recognize the IR laser pointer beam, or other energy beam. For example, an IR laser beam can be used to "grab" and "drag" the projected visual information, if desired. Thus, a user can "grab" the projected visual information by activating the laser, and drag the projected visual information by moving the activated laser beam. Deactivating the laser beam can "drop" the projected visual information. It should be understood that such functionality can supplement, but not necessarily replace, the use of gestures in free space as described above. This embodiment is exemplary of the concepts of the present disclosure, and should not be construed as being limiting in any way.

FIG. 6 illustrates an exemplary computer architecture 500 capable of providing the functions of the control system 110 described above. As mentioned above, the control system 110 can be embedded in an ODS 102. Thus, the ODS 102 can include the computer architecture 500 illustrated in FIG. 6. In some embodiments, the control system 110 includes a conventional desktop, laptop, and/or server computer, and may be utilized to execute aspects of the software components presented herein, including the display control system 114, the image analysis system 120, the operating system 122, and/or the application program 124.

The computer architecture 500 illustrated in FIG. 6 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512, which can store computer executable instructions associated with the ODS 102, for example, the display control system 114, the image analysis system 120, the operating system 122, application programs, e.g., the application program 124, and other applications and/or program modules.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to remote computers through a network such as the network 514. The computer architecture 500 may connect to the network 514 through a network interface unit 516 connected to the bus 510. It should be appreciated that the network interface unit 516 also may be utilized to connect to other types of networks and remote computer systems. If the control system 110 is not part of the ODS 102, the computer architecture 500 may connect to the ODS 102 through the network interface unit 516 and/or the network 514. The computer architecture 500 also may include an input/output controller 518 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 512 and RAM 506 of the computer architecture 500, including an operating system 122 suitable for controlling the operation of the ODS 102, the control system 110, and/or a networked desktop, laptop, or server computer. The mass storage device 512 and RAM 506 also may store one or more program modules. In particular, the mass storage device 512 and the RAM 506 may store the display control system 114, the image analysis system 120, and/or the application program 124. The mass storage device 512 and the RAM 506 also may store other types of program modules and data.

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 6, may include other components that are not explicitly shown in FIG. 6, or may utilize an architecture completely different than that shown in FIG. 6.

Based on the foregoing, it should be appreciated that mechanisms for interacting with an omni-directional display have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method for detecting interactions with an omni-directional display, the method comprising:
    projecting visual information onto a display surface, the visual information being projected by a projection system;
    emitting infrared energy toward the display surface;
    capturing an image at an image capture device, the image comprising data corresponding to an amount of reflected infrared energy;
    analyzing the captured image to detect a movement of a structure located between the projection system and the display surface;
    in response to detecting the movement of the structure, analyzing the detected movement to determine if the movement comprises a recognized control command;
    in response to determining the movement comprises the recognized control command, determining if a voice command is relevant to execution of the recognized control command;
    in response to determining the voice command is relevant to the execution of the recognized control command, determining if the voice command has been received;
    in response to determining the voice command has been received, determining if the received voice command is consistent with the recognized control command and if the recognized control command is consistent with the received voice command; and
    executing recognized control command if the received voice command and the recognized control command are consistent with each other.

2. The method of claim 1, further comprising ignoring the recognized control command until the voice command is received and is consistent with the recognized control command.

3. The method of claim 1, further comprising in response to determining the detected movement comprises the recognized control command, determining a location of the control command with respect to the projected visual information.

4. The method of claim 3, further comprising determining how to manipulate the projected visual information in response to the recognized control command and the location of the recognized control command, and manipulating the projected visual information in accordance with the determining.

5. The method of claim 4, further comprising determining if movement of the recognized control command has ceased.

6. The method of claim 5, wherein the control command comprises a zoom command, and wherein the method further comprises accelerating the rate at which the zoom command is applied to the projected visual information in response to determining that the movement of the recognized control command has not ceased.

7. The method of claim 3, further comprising:
    assigning a gesture point comprising a portion of the projected visual information corresponding to the location of the control command with respect to the projected visual information; and
    manipulating the projected visual information by moving the gesture point with the detected movement.

8. The method of claim 1, further comprising:
in response to detecting a plurality of movements and determining that the plurality of movements correspond to a recognized control command, assigning a plurality of gesture points, each of the gesture points comprising a respective portion of the projected visual information and corresponding to a location of a respective one of the plurality of movements; and
manipulating the projected visual information by moving each of the plurality of gesture points with the respective one of the plurality of movements.

9. The method of claim 1, wherein the projecting comprises projecting the visual information onto a display surface, the display surface comprising walls of a room.

10. The method of claim 1, wherein the projecting comprises projecting the visual information onto a display surface, the display surface comprising walls and a ceiling of a room.

11. An omni-directional display system for detecting interactions with an omni-directional display, the system comprising:
a detection system having an infrared energy emitter configured to emit infrared energy toward a display surface, and an image capture device configured to capture an image corresponding to an amount of reflected infrared energy; and
an image analysis system configured to
analyze the captured image to detect a movement of a structure located between the infrared energy emitter and the display surface,
analyze the detected the movement of the structure to determine if the movement comprises a recognized control command,
in response to determining the movement comprises the recognized control command, determine if a voice command is relevant to execution of the recognized control command,
in response to determining the voice command is relevant to the execution of the recognized control command, determine if the voice command has been received,
in response to determining the voice command has been received, determine if the received voice command is consistent with the recognized control command and if the recognized control command is consistent with the received voice command, and
execute the recognized control command if the recognized control command and the received d voice command consistent with each other.

12. The omni-directional display system of claim 11, the image analysis system being further configured to determine a location of the movement of the structure with respect to the projected visual information.

13. The omni-directional display system of claim 12, further comprising a control system in communication with the image analysis system, the control system being configured to determine how to manipulate the projected visual information in response to the recognized control command and the location of the recognized control command with respect to the projected visual information, and to manipulate data corresponding to projected visual information in accordance with the determining.

14. The omni-directional display system of claim 13, wherein the image analysis system is further configured to ignore the recognized command until the voice command is received and is consistent with the recognized control command.

15. The omni-directional display system of claim 13, wherein the control system determines how to manipulate the projected visual information by
analyzing information indicating a location of the control command with respect to the projected visual information,
determining if the recognized control command has been released, and
manipulating the projected visual information in accordance with the analyzing and the determining.

16. A method for detecting interactions with an omni-directional display, the method comprising:
projecting visual information onto a display surface, the visual information being projected by a projection system;
emitting infrared energy toward the display surface;
capturing an image at an image capture device, the image corresponding to an amount of reflected infrared energy;
analyzing the captured image to detect a movement of a structure located between the projection system and the display surface;
in response to detecting the movement of the structure, determining if the movement corresponds to a control command used to manipulate the projected visual information and if so, determining a location of the control command with respect to the projected visual information;
analyzing the control command and the location of the control command to determine how to manipulate the projected visual information;
analyzing the captured image to detect movement of a structure between the projection system and the display surface;
in response to detecting movement, analyzing the detected movement to determine if the movement comprises a recognized control command;
in response to determining the movement comprises the recognized control command, determining if a voice command is relevant to execution of the recognized control command;
in response to determining the voice command is relevant to the execution of the recognized control command, determining if the voice command has been received;
in response to determining the voice command has been received, determining if the received voice command is consistent with the recognized control command and if the recognized control command is consistent with the received voice command
manipulating data corresponding to the projected visual information; and
projecting the manipulated projected visual information toward the display surface.

* * * * *